US009390298B2

United States Patent
Nguyen (10) Patent No.: US 9,390,298 B2
(45) Date of Patent: Jul. 12, 2016

(54) APPLICATION ROUTING CONFIGURATION FOR NFC CONTROLLER SUPPORTING MULTIPLE NFCEES

(75) Inventor: Duc Hai Dong Nguyen, Bochum (DE)

(73) Assignee: BlackBerry Limited, Waterloo, Ontario (CA)

( * ) Notice: Subject to any disclaimer, the term of this patent is extended or adjusted under 35 U.S.C. 154(b) by 429 days.

(21) Appl. No.: 13/885,633

(22) PCT Filed: Nov. 17, 2010

(86) PCT No.: PCT/EP2010/067708
§ 371 (c)(1),
(2), (4) Date: Sep. 27, 2013

(87) PCT Pub. No.: WO2012/065643
PCT Pub. Date: May 24, 2012

(65) Prior Publication Data
US 2014/0035727 A1    Feb. 6, 2014

(51) Int. Cl.
*G06K 7/00* (2006.01)
*H04W 8/00* (2009.01)
(Continued)

(52) U.S. Cl.
CPC .............. *G06K 7/0008* (2013.01); *H04L 67/16* (2013.01); *H04W 4/008* (2013.01); *H04W 12/08* (2013.01);
(Continued)

(58) Field of Classification Search
CPC ......... G06K 7/0008; H04B 5/00; H04W 4/00; H04L 9/32; G06F 21/00
USPC .............. 340/10.1–10.5; 455/41.1, 41.2, 558; 235/462.25, 462.45; 370/252, 338; 726/7
See application file for complete search history.

(56) References Cited

U.S. PATENT DOCUMENTS

| 6,776,339 B2 * | 8/2004 | Piikivi | G05B 19/00 235/375 |
| 7,471,200 B2 * | 12/2008 | Otranen | G06K 7/0008 340/505 |

(Continued)

FOREIGN PATENT DOCUMENTS

| CN | 101501735 A | 8/2009 |
| EP | 2211480 A1 | 7/2010 |
| WO | 2004029860 A1 | 4/2004 |

OTHER PUBLICATIONS

Chinese Office Action as Received in Co-pending Application No. 201080070222.0 on May 28, 2015; 7 pages. (No English translation available).

(Continued)

*Primary Examiner* — Nam V Nguyen
(74) *Attorney, Agent, or Firm* — Conley Rose, P.C.; J. Robert Brown, Jr.

(57) ABSTRACT

The present document relates to Near Field Communication (NFC). In particular, the present document relates to the routing of application related information in a system comprising multiple NFC Execution environments (NFCEE). A method for identifying an application on an NFC enabled device (200) comprising a plurality of NFC execution environments (204, 205, 206, 207) is described, wherein the application is hosted by one of the plurality of NFC execution environments (204, 205, 206, 207). In one aspect an example method comprises: receiving an external request for accessing the application over an air interface (202) of the NFC enabled device (200); forwarding the request to more than one of the plurality of NFC execution environments (204, 205, 206, 207); receiving more than one response to the request from the more than one of the plurality of NFC execution environments (204, 205, 206, 207), respectively; and analyzing the more than one response to identify a positive response indicating that the application is hosted by a corresponding one of the plurality of NFC execution environments (204, 205, 206, 207).

18 Claims, 4 Drawing Sheets

(51) Int. Cl.
*H04B 5/00* (2006.01)
*H04W 4/00* (2009.01)
*H04W 12/08* (2009.01)
*H04L 29/08* (2006.01)
*H04M 1/725* (2006.01)
*H04W 24/00* (2009.01)
*H04W 74/00* (2009.01)
*H04W 84/10* (2009.01)

(52) U.S. Cl.
CPC ......... *H04M 1/7253* (2013.01); *H04M 2250/04* (2013.01); *H04W 24/00* (2013.01); *H04W 74/004* (2013.01); *H04W 84/10* (2013.01)

(56) References Cited

U.S. PATENT DOCUMENTS

| | | | | |
|---|---|---|---|---|
| 8,060,012 | B2* | 11/2011 | Sklovsky | G06F 9/445 455/41.1 |
| 8,117,445 | B2* | 2/2012 | Werner | H04L 9/0844 713/168 |
| 8,209,754 | B2* | 6/2012 | Cheon | G06Q 20/367 713/159 |
| 8,260,199 | B2* | 9/2012 | Kowalski | G06K 7/10178 235/462.25 |
| 8,342,415 | B2* | 1/2013 | Soh | G06K 7/10237 235/451 |
| 8,401,474 | B2* | 3/2013 | Charrat | G06Q 20/3278 455/41.2 |
| 8,744,347 | B2* | 6/2014 | Charrat | G06Q 20/341 455/41.1 |
| 9,020,423 | B2* | 4/2015 | Naniyat | G06K 7/0008 455/41.1 |
| 2004/0087273 | A1* | 5/2004 | Perttila | G01S 13/751 455/41.2 |
| 2006/0052055 | A1* | 3/2006 | Rowse | G06K 7/0008 455/41.1 |
| 2007/0057057 | A1* | 3/2007 | Andresky | G06K 7/0008 235/451 |
| 2008/0222711 | A1* | 9/2008 | Michaelis | G07C 9/00039 726/7 |
| 2009/0191811 | A1* | 7/2009 | Griffin | G06Q 20/10 455/41.1 |
| 2010/0227553 | A1 | 9/2010 | Charrat et al. | |
| 2011/0226853 | A1* | 9/2011 | Soh | G06K 7/10237 235/380 |

OTHER PUBLICATIONS

PCT International Search Report; Application No. PCT/EP2010/067708; Sep. 22, 2011; 6 pages.
PCT Written Opinion of the International Searching Authority; Application No. PCT/EP2010/067708; Sep. 22, 2011; 11 pages.
GSMA; "Mobile NFC Technical Guidelines"; Version 2.0; Nov. 2007; 95 pages.
Chinese Office Action as Received in Co-pending Application No. 201080070222.0 on Jan. 18, 2016; 5 pages. (No English translation available).

* cited by examiner

APPLICATION ROUTING CONFIGURATION FOR NFC CONTROLLER SUPPORTING MULTIPLE NFCEES

CROSS REFERENCE

This application is a filing under 35 U.S.C. 371 of International Application No. PCT/EP2010/067708 filed Nov. 17, 2010, entitled "Application Routing Configuration for NFC Controller Supporting Multiple NFCEEs" which is incorporated by reference herein as if reproduced in its entirety.

TECHNICAL FIELD

The present document relates to Near Field Communication (NFC). In particular, the present document relates to the routing of application related information in a system comprising multiple NFC Execution environments (NFCEE).

TECHNICAL BACKGROUND

Near Field Communication (NFC) is a short-range wireless communication technology which enables the exchange of data between devices over a short distance (e.g. about a 10 centimeter distance). NFC is primarily (but not exclusively) aimed at the usage in mobile communication devices, such as mobile phones, smart phones, and other portable electronic devices. An NFC device can typically communicate with existing ISO/IEC 14443 smartcards and readers, as well as with other NFC devices, and is thereby compatible with existing contactless infrastructure already in use. Contactless infrastructure is currently deployed for public transportation, payment and other services.

NFC enabled devices can typically change their mode of operation to be in a reader/writer mode, a peer-to-peer mode, or a card emulation mode. The different operating modes are based on the ISO/IEC 18092 NFC IP-1 and ISO/IEC 14443 contactless smartcard standards. In the reader/writer mode, the NFC device is capable of reading NFC Forum-mandated tag types, such as in the scenario of reading an NFC Smart Poster tag. The reader/writer mode on the RF interface is compliant to the ISO 14443 and FeliCa schemes. In Peer-to-Peer mode, two NFC devices can exchange data. For example, Bluetooth or WiFi link set up parameters or data such as virtual business cards or digital photos can be exchanged between devices in the Peer-to-Peer mode. Furthermore, the Peer-to-Peer mode is standardized in the ISO/IEC 18092 standard. In Card Emulation mode, the NFC device appears to a reader or writer apparatus much the same as a traditional contactless smartcard. This Card Emulation functionality enables contactless payments and ticketing by NFC devices without changing the existing contactless smartcard infrastructure.

In order to enable a mobile communication device for NFC services, the mobile communication device may be provided with one or more NFCEEs, i.e. with one or more NFC execution environments. These NFCEEs may host different applications for the execution of different transactions. Furthermore, the mobile communication device is provided with a NFC controller (NFCC) which controls, via a wireless air interface, the communication between an external remote reader/writer and the applications stored on the different NFCEEs.

A remote reader can select or address a particular application using an ISO7816-4 SELECT command if the dedicated communication channel between the NFCC and the NFCEE comprising the particular application is activated. In case of a single NFCEE, the NFCC activates the communication channel in advance so that communication between the remote reader and the NFCEE can take place without delay or latency related to activating the communication channel. However, in case of multiple NFCEEs, the NFCC is not aware of the NFCEE the particular application resides on. This is due to missing information about which application (associated with an Application Identifier, AID, indicated in the SELECT command) is hosted by which NFCEE. As a result, the NFCC is not able to activate the appropriate communication channel and, therefore, communication cannot take place between the remote reader and the particular application. The present document addresses this problem by describing example routing mechanisms between the NFCC and the plurality of NFCEEs, as well as example registration methods of the NFCEEs at the NFCC.

SUMMARY

According to an aspect, a method for identifying an NFC application on an NFC enabled device comprising a plurality of NFC execution environments is described. The application may be hosted by one of the plurality of NFC execution environments. Typically, the plurality of NFC execution environments (also referred to as Secure Elements (SE)) hosts a plurality of different applications. An NFC execution environment may host several different applications. In view of the fact that an NFC controller of the NFC enabled device typically does not know which applications are hosted by which one of the plurality of NFC execution environments (or the device host of the NFC enabled device), the NFC controller may employ the methods outlined in the present document.

It should be noted that alternatively or in addition to the plurality of NFC execution environments, the NFC enabled device may comprise a device host which could host one or more applications that may be identified using the methods outlined in the present document. The NFC enabled device could be a mobile telephone or a smart phone or a portable device comprising an additional NFC controller. The NFC controller may be configured to communicate, via an air interface, with external devices, e.g. a remote reader and/or a remote writer. In an embodiment, the NFC controller provides the air interface configured to communicate with external NFC devices.

The application may be a card emulation application allowing the remote reader and/or writer to read from and/or write to the NFC enabled device as if the NFC enabled device were an ISO 14443 compatible contactless smart card. The air interface via which the NFC controller communicates with the external reader and/or writer, may be compatible with ISO 18000-3 (which is incorporated by reference); and/or may be operated at 13.56 MHz; and/or may have a range of less than 20 cm.

An example method for identifying an application on an NFC enabled device may comprise the operation of receiving an external request for accessing an application over the air interface of the NFC enabled device. The external request may be issued by the remote reader and/or remote writer. In particular, the request for accessing the application may correspond to an ISO7816-4 SELECT (AID) message, the AID being an identifier of the application.

The example method may comprise the operation of sniffing data traffic coming over the air interface in order to detect the request for accessing the application. In other words, the NFC controller may observe the data traffic coming over the air interface and identify a request for accessing an application, e.g. a SELECT (AID) request, from the incoming data traffic. The incoming data traffic other than the request may be ignored or discarded. Alternatively, the other incoming traffic may be directly forwarded to one specific NFC execution environment (NFCEE) or the device host (DH).

The example method may comprise the operation of forwarding an inquiry associated with the external request to multiple NFC execution environments when a plurality of NFC execution environments is instantiated. In an embodiment, the inquiry corresponds to the external request. In particular, only an inquiry regarding the detected request for accessing the application may be forwarded to the multiple NFC execution environments while the other incoming traffic may either be ignored or discarded or forwarded to only a single specific NFCEE or the DH.

The operation of forwarding the inquiry to multiple NFC execution environments may comprise broadcasting the inquiry to all of the plurality of NFC execution environments, and possibly to the device host. As such, all the NFCEE and the DH would receive the request for accessing the application and could verify if the application is hosted on the particular NFCEE or DH. Alternatively, forwarding may comprise sequentially unicasting the inquiry to the multiple NFC execution environments. As such, the NFC controller would verify sequentially with each NFCEE or with the DH if the requested application is hosted by the particular NFCEE or the DH.

As a result of forwarding the inquiry to more than one of the plurality of NFC execution environments, the NFC controller would receive more than one response to the inquiry from the more than one of the plurality of NFC execution environments, respectively. In other words, each of the NFCEE (and/or the DH) having received a copy of the inquiry would issue in return a response to the inquiry, which would be received by the NFC controller. As such, the NFC controller would receive more than one response from the respective more than one of the plurality of NFCEE (and/or the DH).

The example method may further comprise analyzing the more than one response in order to identify a positive response indicating that the application is hosted by a corresponding one of the plurality of NFC execution environments. In other words, the NFC controller may analyze the responses received from the NFCEEs (and/or the DH). The responses may be negative, indicating that the corresponding NFCEEs (and/or the DH) do not host the requested NFC application. On the other hand, one or more of the responses may be positive, indicating that the corresponding NFCEE (and/or the DH) hosts the requested application, e.g. an application having a particular application identifier (AID). A positive response may be a certain message type, e.g. an "OK" response message in accordance to ISO7816-4 (the "OK" response message having a hex value of "9000"). A negative response may be a "Not found" response message in accordance to ISO7816-4 (the "Not found" response message having a hex value of "6A82").

As such, in case of sequential unicasting of the inquiry, the forwarding may comprise the operation of sequentially unicasting the inquiry to the more than one of the plurality of NFC execution environments. The receiving more than one response may comprise receiving a response from an NFC execution environment subject to the unicast inquiry, and the analyzing may comprise analyzing the received response subject to the unicast inquiry.

In other words, the sequential unicasting may involve the following iterative process: forwarding the inquiry to a first of the more than one of the plurality of NFC execution environments; receiving a first response from the first of the more than one of the plurality of NFC execution environments; and determining from the first response whether the application is hosted by the first of the more than one of the plurality of NFC execution environments. If the application is determined to not be hosted by the first NFCEE, the iterative process may comprise interrogating a second of the more than one of the plurality of NFC execution environments. The interrogating may comprise forwarding the inquiry, receiving a second response from the second of the more than one of the plurality of NFC execution environments, and analyzing the second response.

Depending on the analyzing of the second response, the method could either proceed with a further iteration of the forwarding, receiving and analyzing operations (in case of a negative response) or terminate the iterative process (in case of a positive response). In the latter case, analyzing the second response would comprise determining that the application is hosted by the second of the more than one of the plurality of NFC execution environments.

The forwarding of the inquiry to and the receiving of a response from an NFCEE and/or DH may involve activation of a communication channel between the NFC controller and the respective NFCEE and/or DH. As such, the example method may comprise activating a communication channel to a particular NFC execution environment (and/or DH) prior to forwarding the inquiry to the particular NFC execution environment. In a similar manner, the example method may comprise deactivating the communication channel to the particular NFC execution environment (and/or DH), subject to receiving a response from the particular NFC execution environment indicating that the application is not hosted by the particular NFC execution environment, i.e. subject to a negative response. In general and in order to save resources (e.g. power consumption, processor instructions for maintaining the unused channels, etc.), it may be beneficial to deactivate a communication channel as soon as the corresponding NFCEE (and/or DH) has answered with a negative response indicating that the requested application is not hosted by the corresponding NFCEE (and/or DH). Alternatively or in addition, subsequent to receiving a positive response from an NFCEE (or DH) indicating that the requested application is hosted by the NFCEE (or DH), some or all activated communication channels—apart from the channel corresponding to the NFCEE (or DH) having issued the positive response—may be deactivated.

It may occur that the requested application is not hosted by any of the NFCEEs (and/or DH). As such, the example method may comprise determining, subject to the analyzing operation, that no positive response has been received; and sending one of the more than one response over the air interface. By way of example, the last one of the responses received by the NCI controller could be forwarded over the air interface, e.g. to the remote reader/writer having sent the request for accessing the application.

In a similar manner, subject to identifying a single positive response, the single positive response could be sent over the air interface. On the other hand, subject to identifying a plurality of positive responses from a corresponding set of the more than one of the plurality of NFC execution environments and/or the DH, the NFC controller could be configured to determine a selected NFC execution environment and/or the DH from the set; and to send the positive response from the selected NFC execution environment over the air interface. The selected NFCEE (and/or the selected DH) could be determined according to a predetermined priority. As such, ambiguities caused by applications using the same application identifier could be resolved.

The example method may comprise monitoring the more than one received response to verify that a response has been received from each of the more than one of the plurality of NFC execution environments. While monitoring, a waiting time-out message could be sent over the air interface to avoid a time-out of a connection to a sender of the request for accessing the application. The waiting time-out message could be an ISO14443 frame waiting time-out message. As such, it can be ensured that the NFC controller can verify the presence of the requested application on all of the NFCEEs (and/or the DH) without incurring the risk of a time-out of the request.

Once the NFCEE (and/or DH) hosting the requested application has been identified, further data traffic coming over the air interface could be forwarded by the NFC controller to the identified NFC execution environment (and/or DH). The further data traffic may relate to transaction data between a remote reader and/or writer external to the NFC enabled device and the requested application.

According to a further aspect, an example method for identifying a particular application on an NFC enabled device comprising a plurality of NFC execution environments is described. The particular application may be hosted by one of the plurality of NFC execution environments (and/or a DH of the NFC enabled device). It should be noted that any of the aspects described in the present document may also be applicable to this method.

The example method may comprise registering some or all of the applications hosted by the plurality of NFC execution environments (and/or the DH) with the NFC controller of the NFC enabled device. The registering may be performed in accordance to the ESTI technical specification ETSI TS 102 622 v7.5.0, or an extended version of that technical specification. This ESTI technical specification is incorporated by reference.

Subject to the registering, the example method may comprise determining or establishing an application database at the NFC controller, wherein the database indicates a cross-reference or mapping between the registered applications and the NFCEEs (and/or the DH) which are hosting the registered applications. Furthermore, the database may comprise information regarding the communication channels to the NFCEEs (and/or the DH) which are to be activated or deactivated prior and post data exchange between the NFC controller and the respective NFCEEs (and/or the DH). The database may be used to identify the location of an application within the NFC enabled device.

In a similar manner to the example method outlined above, the present method may comprise receiving an external request at the NFC controller for accessing the particular application over an air interface of the NFC enabled device. In order to determine a particular NFC execution environment (and/or DH) hosting the particular application, the NFC controller may consult the application database instead of broadcasting or sequentially unicasting an inquiry associated with the request and waiting for an affirmative response from an NFCEE.

As such, the NFC controller may directly identify the correct NFCEE (and/or DH) and proceed with activating a communication channel to the particular NFC execution environment; and forwarding an inquiry associated with the request to the particular NFC execution environment. In an embodiment, the inquiry corresponds to the request. Subject to the forwarding, the NFC controller may receive a response regarding the inquiry from the particular NFC execution environment; and send the response over the air interface (e.g. to a remote reader/writer). Subject to receiving a positive response from the NFCEE (and/or DH) indicating that the particular application is hosted by the particular NFCEE (and/or DH), the method may proceed in forwarding further data traffic coming over the air interface to the particular NFC execution environment. The further data traffic may relate to transaction data for the particular application.

According to another aspect, an NFC controller configured to identify an application on an NFC enabled device comprising a plurality of NFC execution environments is described. The NFC controller may be configured to execute any of the method operations outlined in the present document. Furthermore, the NFC controller may comprise an NFC controller interface (NCI) configured to receive initialization information indicative of how a request for accessing the application received over an air interface is to be forwarded to any of the plurality of NFC execution environments (and/or the DH).

According to a further aspect, an electronic device is described (e.g. a smart phone or a mobile telephone or a portable electronic device). The electronic device may comprise an NFC controller according to any of the aspects outlined in the present document. The NFC controller may be configured to identify the one of the plurality of NFC execution environments (and/or the DH) hosting a particular application, subject to a request from a remote reader and/or remote writer for accessing the particular application. Furthermore, the NFC controller may provide a wireless interface configured to communicate with the remote reader and/or remote writer. Alternatively, the wireless interface may be provided separately from the NFC controller. Furthermore, the electronic device may comprise a plurality of NFC execution environments, with one of the plurality of NFC execution environments hosting the requested NFC application. In addition, the electronic device may comprise a device host (DH), which may also host one or more NFC applications.

According to a further aspect, a software program is described. The software program may be stored on a computer-readable medium (which may be tangible or otherwise non-transitory) as instructions that are adapted for execution on a processor and for performing the aspects and features outlined in the present document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computer.

It should be noted that the methods and systems including various example embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

SHORT DESCRIPTION OF THE FIGURES

The different aspects outlined in the present document are explained below in an exemplary manner with reference to the accompanying drawings, wherein.

DESCRIPTION OF THE FIGURES

Figure 1:
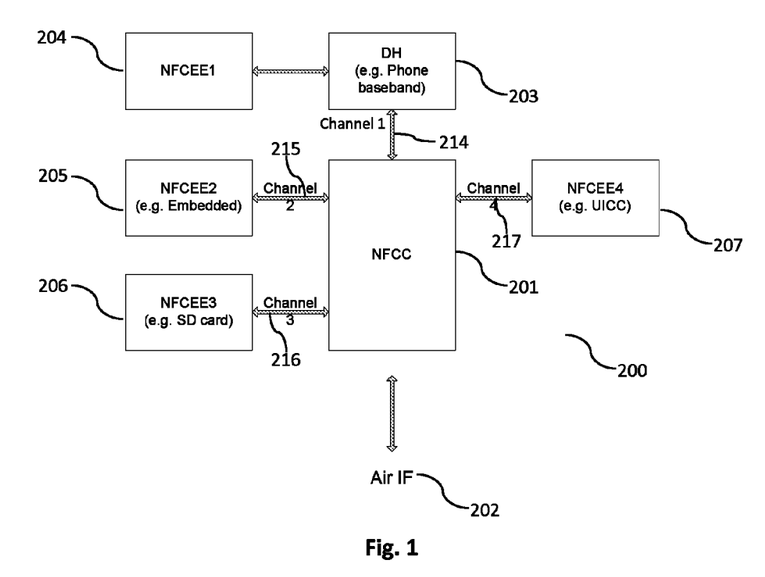
FIG. 1 shows an example configuration of a NFC enabled portable electronic device.

FIG. 1 illustrates an example configuration of an NFC enabled portable electronic device 200. The device 200 comprises an NFC controller 201 configured to manage the communication between external/remote devices and the plurality of NFC execution environments 204, 205, 206, 207. Furthermore, the NFCC 201 of the device 200 is configured to instantiate an air interface 202, e.g. an NFC compatible interface at 13.56 MHz, which an external/remote device can use to communicate with the NFC execution environments 204, 205, 206, 207. The air interface 202 may be provided by the NFC controller 201 alone or in cooperation with an NFC transceiver. In addition, the device 200 comprises a device host 203 configured to provide an interface between the different functions of the portable electronic device 200 and the NFC functionalities provided by the NFCC 201. The device host 203 can correspond to the baseband functionality of a mobile telephone or smart phone.

FIG. 1 also illustrates various types of NFCEEs, also referred to as Secure Elements (SE). NFCEE 204 is directly provided by the device 200 via the device host 203 and can be addressed via the communication channel 214. NFCEE 205 is an embedded SE which can be addressed via communication channel 215. NFCEE 206 corresponds to a removable SD card (Secure Digital memory card) which can be accessed via the communication channel 216. NFCEE 207 is a UICC (Universal Integrated Circuit Card) which can be accessed via the communication channel 217. The different NFCEEs 204, 205, 206, 207 provide storage facilities for storing various applications such as ticketing applications, card emulations applications, payment applications, etc. Furthermore, the different NFCEEs 204, 205, 206, 207 provide processing capabilities for the execution of the various applications. In addition, the different NFCEEs 204, 205, 206, 207 may provide security functionalities such as authentication and authorization. Overall, it may be stated that the different NFCEEs 204, 205, 206, 207 host various applications by providing storage, processing and/or security functionalities.

The NFC Controller 201 is connected with the Device Host 203 and with one or several Secure Elements (e.g. UICC, Micro SD, SmartMx) 204, 205, 206, 207 which can be embedded or removable. In card emulation mode the NFCC 201 acts as the RF (radio frequency) front end and forwards the traffic received over the air interface 202 (e.g. from an external reader) to the DH 203, 204 or to one of the SEs 205, 206, 207. In case of Type A and B smart card technology, the protocol which is run over the RF interface 202 is based on ISO 7816-4 and this protocol is used by the external reader to talk to applications residing on the DH 203, 204 or the SEs 205, 206, 207 (Type F smart card technology, i.e. FeliCa, does not use ISO 7816-4). If the applications reside in different locations, some on the DH 203, 204, as well as some on the plurality of SEs 205, 206, 207, the NFCC 201 is not able to determine the right destination, i.e. the DH 203, 204 or the SEs 205, 206, 207, to set up the right communication channel 214, 215, 216, 217, and to route the RF traffic accordingly. Therefore, routing and/or registration methods described hereinafter allow for a linking between a request from a remote reader and an application hosted by one of the plurality of SEs or the DH.

As indicated above, the plurality of NFCEEs 204, 205, 206, 207 may comprise different applications for different transaction services (e.g. payment applications, ticketing applications, applications relating to identity documents). Each of these applications is typically identified using a unique application identifier (AID). However, in view of the fact that the device 200 may be configured with different removable, exchangeable, addable NFCEEs 206, 207, the NFCC 201 is typically not aware of the applications which are available on the device 200. In addition, the applications residing on the NFCEEs may also be removable (i.e. installed, de-installed, activated, deactivated). Furthermore, the NFCC 201 does not know on which of the NFCEEs 204, 205, 206, 207 a particular application resides on.

If the device 200 is brought in the proximity of an external/remote reader, the remote reader tries to identify an appropriate application on the device 200 using a SELECT (AID) command specified in ISO7816-4. The ISO7816-4 is incorporated by reference. The SELECT (AID) command is passed to the NFCC 201 via the Air Interface 202. As outlined above, the NFCC 201 is, however, not aware of the appropriate NFCEE 204, 205, 206, 207 which hosts the application that corresponds to the AID specified in the SELECT (AID) command. Consequently, no communication can be set up between the remote reader and the particular application on the device 200.

A possible approach to overcoming this issue is to install a routing table from the DH 203 into the NFCC 201. This routing table comprises a mapping between the applications which are available of the NFC enabled device 200 and the NFCEEs 204, 205, 206, 207 which host the applications. Once the NFCC 201 receives a SELECT (AID) request from a remote reader, the NFCC 201 looks into the routing table, activates the appropriate channel 214, 215, 216, 217 and enables communication between the remote reader and the requested NFCEE 204, 205, 206, 207 relative to the AID. The drawback of this approach is that the DH 203 must have knowledge about all existing applications in all NFCEEs 204, 205, 206, 207. This information may not be available due to different business interests of the different application providers (or due to privacy and/or security issues). In other words, the different service providers of the different applications may not want to share information regarding the applications installed on the NFCEEs 204, 205, 206, 207 of the device 200. As such, another approach would be useful because providing the NFCC 201 with an incomplete routing table indicating less than all of the applications stored on the plurality of NFCEEs 204, 205, 206, 207 may cause difficulties in addressing requests.

As such, solutions are desirable which do not involve the sharing of application data from the different NFCEEs 204, 205, 206, 207, i.e. solutions which do not employ the determination of a joint routing table in the DH 203 which is subsequently passed to the NFCC 201.

Figure 2:
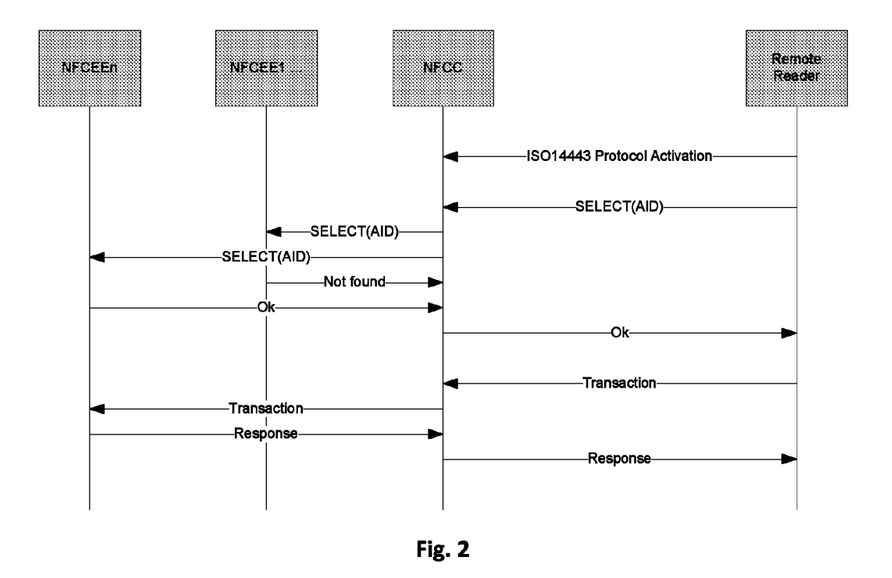
FIG. 2 illustrates an example message flow chart between a remote reader, the NFCC and multiple NFCEEs.

FIG. 2 illustrates a solution which is based on the broadcasting by the NFCC 201 of a received SELECT (AID) request to some or all of the plurality of NFCEEs 204, 205, 206, 207. In the example solution shown in FIG. 2, the NFCC 201 sniffs the traffic coming from the remote reader and broadcasts the ISO7816-4 message SELECT (AID) to all SEs 204, 205, 206, 207. For this purpose, all channels 214, 215, 216, 217 may be activated before the broadcasting of the SELECT (AID) message. The NFCC 201 also sniffs the traffic sent from the NFCEEs 204, 205, 206, 207, filters some or all negative responses and forwards the positive response back to the remote reader. After this procedure, the NFCC 201 will typically have identified the correct destination NFCEE 204, 205, 206, 207 that comprises the application corresponding to the identifier AID; the correct NFCEE 204, 205, 206, 207 being the NFCEE from where the positive response comes from. As a consequence, the NFCC 201 will forward the traffic coming from the remote reader to the identified NFCEE. On the other hand, if all responses are negative, the NFCC 201 will forward one of the negative responses back to remote reader, in order to inform the remote reader that no application corresponding to the identifier AID is available on the device 200.

Figure 3:
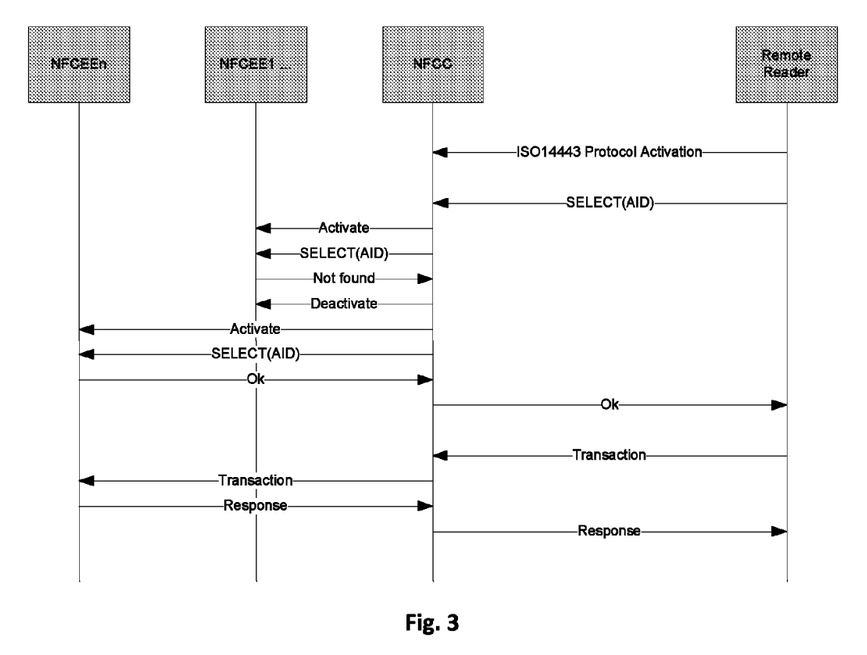
FIG. 3 illustrates another example message flow chart between a remote reader, the NFCC and multiple NFCEEs.

A further solution is illustrated in FIG. 3 where the NFCC 201 sequentially unicasts the SELECT(AID) command to the plurality of NFCEEs 204, 205, 206, 207, in order to identify the NFCEE hosting the addressed application. In the example solution illustrated in FIG. 3, the NFCC 201 sniffs the traffic coming from a remote reader. Upon receipt of a SELECT (AID) command, the NFCC 201 activates a first of the plurality of communication channels 214, 215, 216, 217, forwards the SELECT (AID) to the connected NFCEE 204, 205, 206, 207, and checks the response received from the particular NFCEE 204, 205, 206, 207. If the response is negative, the NFCC 201 proceeds with a next of the plurality of communication channels 214, 215, 216, 217, and so on. If there is no positive response after having checked the response from all of the plurality of NFCEEs 204, 205, 206, 207, the NFCC 201 will forward a negative response (e.g. the last negative response received) back to the remote reader.

It should be noted that due to the sequential unicast of the SELECT (AID) command, this solution typically has reduced requirements with regards to processing and memory capacities of the NFCC 201 than the broadcasting solution outlined above. On the other hand, the verification time may be longer in the unicast solution than in the broadcast solution. However, the ISO14443-4 specification, relating to a transport protocol for Identification cards—Contactless integrated circuit cards—Proximity cards, allows the NFCC 201 to extend the frame waiting time so that the NFCC 201 has more time to collect the responses from the different NFCEEs 204, 205, 206, 207 to the SELECT (AID) command before sending the final response back to the remote reader. The ISO14443-4 specification is incorporated by reference.

Figure 4:
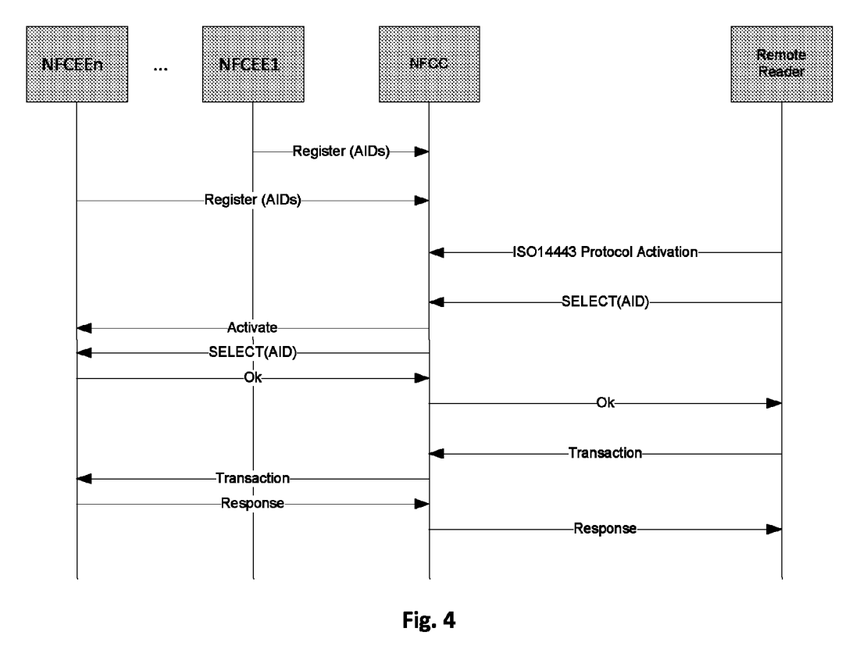
FIG. 4 illustrates a further example message flow chart between a remote reader, the NFCC and multiple NFCEEs.

FIG. 4 illustrates another solution where the different NFCEEs 204, 205, 206, 207 (which may also be referred to as SEs) register directly with the NFCC 201 prior to being addressable by a remote reader. In this example solution the devices which are connected to the NFCC 201 and which may host applications, i.e. the DH 203 and the different SEs 204, 205, 206, 207, may register the AIDs which they want to be selectable by a remote reader. This registration should be performed before start of any transactions. In other words, the different host environments (DH or NFCEEs) may register some or all of the applications hosted by them with the NFCC 201. Based on the registrations, the NFCC 201 may determine or establish a routing table or an AID registration database which indicates a mapping between a particular AID, the NFCEE or DH which hosts the particular AID and possibly the communication channel 214, 215, 216, 217 through which the NFCEE or DH can be reached.

When the NFCC 201 receives a SELECT (AID) request from a remote reader, NFCC 201 will check the AID registration database and if the AID is found in the database, the NFCC 201 activates the communication channel to the corresponding NFCEE or DH and forwards the SELECT (AID) request to the registered destination. Upon receipt of a positive response from the NFCEE or DH, the positive response is forwarded by the NFCC 201 to the remote reader. The subsequent transaction data is then directly exchanged between the remote reader and the selected NFCEE or DH via the NFCC 201.

The interface between DH 203 and NFCC 201 is the NFC controller interface (NCI) which already provides an interface for routing configuration (as will be outlined below). This interface can be used to register the AIDs which are supported by the DH 203. If the SE 207 is a UICC, the interface between the SE 207 and the NFCC 201 will be based on the ETSI HCI specification, i.e. ETSI TS 102 622 v7.5.0. The ETSI TS 102 622 v7.5.0 specification is incorporated by reference. This interface already provides a generic registration functionality which could be expanded by one or more additional parameters related to the AID registration. In particular, a new registry for gate "Type A card RF gate" and "Type B card RF gate" could be specified to register an array of AIDs from the UICC 207 to the NFCC 201. It should be noted that the ETSI HCI interface is a generic interface, which could also be supported by other SEs 204, 205, 206 than a UICC SE 207 or by the DH 203. As such, an extended version of the ETSI HCI interface could be used by the different SEs and/or the DH for the registration of their AIDs with the NFCC 201.

The registration solution outlined in the context of FIG. 4 does not entail the forwarding of a SELECT (AID) request received from a remote reader to a plurality of NFCEEs or the DH. As a result of the registration process of the different NFCEEs and the DH with the NFCC 201, the NFCC 201 can build an AID registration database and use the database for routing the SELECT (AID) requests to the right NFCEEs or DH hosting the addressed application. In view of the fact that the AIDs are directly registered with the NFCC 201, the knowledge regarding the different AIDs available on the NFC enabled device 200 remains confidential and confined within the NFCC 201 and is not shared between the DH 203 and the different SEs 204, 205, 206, 207. Furthermore, the registration process may be periodic such that the NFCC 201 could maintain the AID registration database as applications are updated (e.g. new applications are registered and/or registered applications are deregistered) and/or NFCEEs are changed (e.g. installed or removed). Moreover, although not illustrated, applications or NFCEEs could send deregistration messages to the NFCC such that the NFCC can dynamically update the AID registration database.

The routing schemes outlined above may be implemented on the NFCC 201 by amending or adapting the NFC controller interface (NCI) between the DH 203 and the NFCC 201. The NCI is directed at providing a communication between the DH 203 and the NFCC 201 and to thereby enable NFC services on a portable electronic device 200. In particular, the NCI is directed at transferring configuration and/or initialization data regarding the NFCC 201 from the DH 203 to the NFCC 201. The NCI is currently being specified by the FCT Forum and the technical specification NFCForum_TS_NCI_1.0-Draft 6, dated Oct. 18, 2010 is incorporated by reference.

Table 11 of the above mentioned technical specification defines a format on how available NCI features can be passed to the NFCC 201 within a CORE_INIT_CMD command message. One or more of the reserved bits may be used to indicate the routing mode to be used by the NFCC 201. By way of example, a new bit may be added to indicate the support for "Broadcast based CE routing supported". Alternatively or in addition, a new bit may be added to indicate the support for "Unicast based CE routing supported". In an embodiment, Table 11 of the NCI technical specification may be amended as shown in Table 1 (the "x" indicating arbitrary bit values). Alternatively or in addition, a further bit of Octet 1 in Table 1 may be used to indicate that the NFCC supports the explicit registration of AIDs from the NFCEEs and/or the DH. For this purpose b4 of Octet 1 may e.g. be set to "1".

TABLE 1

| | Bit Mask | | | | | | | | |
|---|---|---|---|---|---|---|---|---|---|
| | b7 | b6 | b5 | b4 | b3 | b2 | b1 | b0 | Feature Description |
| Octet 0 | 0 | x | 0 | 0 | 0 | 0 | 0 | 1 | NCI Flow Control |
| MSB | 0 | 1 | 0 | 0 | 0 | 0 | 0 | x | Simple Configuration Messages |
| | All other settings | | | | | | | | RFU |
| Octet 1 | 0 | 0 | 0 | 0 | 0 | 0 | x | 1 | Battery Off Mode |
| | 0 | 0 | 0 | 0 | 0 | 0 | 1 | x | CE Routing supported |
| | 0 | 0 | 0 | 0 | 0 | 1 | 0 | x | Broadcast based CE Routing supported |
| | 0 | 0 | 0 | 0 | 1 | 0 | 0 | x | Unicast based CE Routing supported |
| | All other settings | | | | | | | | RFU |
| Octet 2 | All settings | | | | | | | | RFU |
| Octet 3 | 0 | 0 | 0 | 0 | 0 | 0 | x | 1 | Discovery |
| LSB | 0 | 0 | 0 | 0 | 0 | 0 | 1 | x | Card Emulation |
| | All other settings | | | | | | | | RFU |

Furthermore, the above mentioned NCI technical specification specifies a CE_CONFIGURE_ROUTING_CMD command message which may be used by the DH 203 to configure the NFCC 201 for Card Emulation (CE) communication. The routing configuration may be transmitted using a plurality of bits defined in Table 58 of the NCI technical specification. The bit mask of Table 58 could be amended by a new octet2 as shown in Table 2.

TABLE 2

| | Bit Mask | | | | | | | | |
|---|---|---|---|---|---|---|---|---|---|
| | b7 | b6 | b5 | b4 | b3 | b2 | b1 | b0 | Description |
| Octet 0 | 0 | 0 | 0 | 0 | 0 | 0 | 0 | 1 | On (capable of receiving traffic) |
| | 0 | 0 | 0 | 0 | 0 | 0 | 0 | 0 | Off (traffic not routed) |
| | All other settings | | | | | | | | RFU |
| Octet 1 | 0 | 0 | 0 | 0 | 1 | 1 | 1 | 1 | All technology types when device switched on |
| | 1 | 1 | 1 | 1 | 0 | 0 | 0 | 0 | All technology types when device switched off |
| | 1 | 1 | 1 | 1 | 1 | 1 | 1 | 1 | All technology types immaterial of power state |
| | x | x | x | x | 1 | x | x | x | 7816-4 default when device switched on |
| | x | x | x | x | x | 1 | x | x | Technology A default when device switched on |
| | x | x | x | x | x | x | 1 | x | Technology B default when device switched on |
| | x | x | x | x | x | x | x | 1 | Technology F default when device switched on |
| | 1 | x | x | x | x | x | x | x | 7816-4 default when device switched off |
| | x | 1 | x | x | x | x | x | x | Technology A default when device switched off |
| | x | x | 1 | x | x | x | x | x | Technology B default when device switched off |
| | x | x | x | 1 | x | x | x | x | Technology F default when device switched off |
| | All other settings | | | | | | | | RFU |
| Octet 2 | 0 | 0 | 0 | 0 | 0 | 0 | 0 | 1 | Routing based on Application Type, see [Table 59: Application Type] |
| | 0 | 0 | 0 | 0 | 0 | 0 | 1 | 0 | Routing based on broadcast of selectable 7816-4, see [note 1] |
| | 0 | 0 | 0 | 0 | 0 | 0 | 1 | 1 | Routing based on unicast of selectable 7816-4, see [note 2] |
| | All other settings | | | | | | | | RFU |

The new Octet 2 may be used to control the routing type if routing is enabled by octet 0. It should not be allowed to configure the NFCC to support a mixture of different routing types. For routing based on Application Type, see [Table 59: Application Type] of the above mentioned NCI technical specification.

If the routing type is based on the broadcast of a selectable 7816-4, i.e. on the broadcast of a SELECT(AID) ISO7816-4 request, the Application Type, Length of Application Identifier and Application Identifier fields should be absent. This routing type means that the NFCC should apply the broadcast based CE routing if supported (see Table 1 shown above) and that the NFCEE, associated with the Target Handle (i.e. associated with the AID identifier), should be considered by the NFCC.

If routing type is based on unicast of selectable 7816-4, the Application Type, Length of Application Identifier and Application Identifier fields should be absent. This routing type means that the NFCC should apply the unicast based CE routing if supported (see Table 1 shown above), and that the NFCEE, associated with the Target Handle, should be considered by the NFCC.

In order to support the explicit AID registration of the NFCEEs and/or the DH with the NFCC, Octet2 of Table 2 may be further amended to enable routing based on the AID registration database which has been established by the NFCC as a result of the AID registration. By way of example, b2 of Octet2 could be set to "1" to indicate the use of the AID registration database for SELECT (AID) message routing.

With regard to Table 2 (note 1): it is noted that routing based on broadcast of a selectable 7816-4 may require the NFCC to sniff the traffic from a remote reader and to broadcast the ISO7816-4 message SELECT (AID) to all NFCEEs. A precondition for this is that all communication channels to NFCEEs have been activated before. The NFCC also sniffs the traffic sent from the NFCEEs, filters negative responses and forwards the positive response back to the remote reader. After this procedure, the NFCC should have identified the correct destination NFCEE where the positive response comes from and will forward all the traffic to this NFCEE accordingly. If all responses are negative, NFCC will forward one of the negative responses back to remote reader.

With further regard to Table 2 (note 2): it is noted that routing based on unicast of a selectable 7816-4 may require the NFCC to sniff the traffic from a remote reader, to activate the communication channel, to forward the SELECT (AID) request to the connected NFCEE, to check the response and to go to the next communication channel if the response is negative. If there is no positive response from the last NFCEE, the NFCC will forward the last negative response back to the remote reader. The ISO14443-4 protocol allows the NFCC to extend the frame waiting time so that the NFCC has more time to collect the responses to the SELECT (AID) request before sending the final response back to remote reader.

As outlined above, the message received by a NFCC 201 which may initiate the present methods is the SELECT (AID) message used by the external reader to address the application it wants to talk to. Once receiving this message the NFCC 201 can decode the AID which the external reader wants to talk to. As described in the present document, the NFCC 201 may broadcast the message SELECT (AID) to all SEs 205, 206, 207 and the DH 203, 204. The NFCC 201 then needs to check the answers and determine if the AID is available or not on the particular SE/DH. This way, the NFCC 201 is able to determine the right destination for the RF traffic from the remote reader and to then configure the routing for further traffic accordingly.

Alternatively to broadcasting, the NFCC can forward the message SELECT (AID) to each SE separately (i.e. one-by-one). Once a positive answer is received, the NFCC configures further RF traffic to the particular SE accordingly. In comparison to the broadcast solution, this method typically requires a less powerful NFCC (in term of MIPS) since only one SE is activated at a time when forwarding the SELECT (AID) message.

Alternatively or in addition to broadcasting or unicasting, each SE and the DH may register their AIDs to the NFCC. If the SE is an UICC, a new gate "AID Registry" may be extended in ETSI TS 102 622 to allow UICC to register its AID to the NFCC. For other SEs a proprietary method would be employed as no standard interface exists for such a communication.

A further issue to consider is the handling of duplicated AIDs: AIDs are normally unique. However proprietary AIDs may be reused and therefore duplicated in different SEs/DH connected to the NFCC. When using the broadcasting solution or the register solution, duplicated AIDs can be detected and resolved either by having a preconfigured SE/DH priority ranking or by notifying the DH and by asking for a decision on which of the duplicated AIDs to select.

Figure 5:
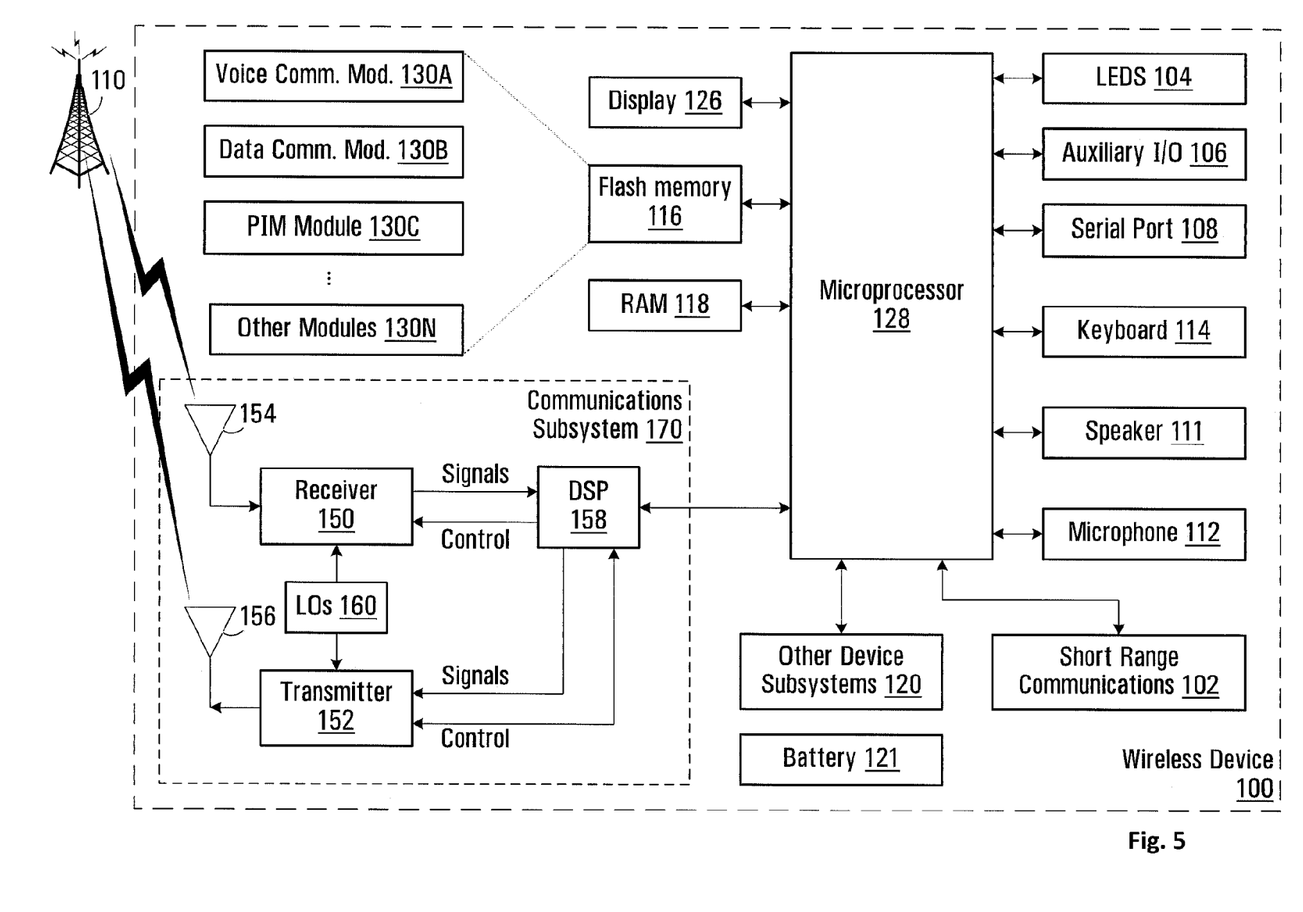
FIG. 5 shows an example electronic handheld device which can be enabled for NFC services.

Referring now to FIG. 5, shown is a block diagram of a mobile station, user equipment or wireless device 100 that may, for example, implement any of the methods described in this disclosure. In particular, the user equipment 100 may be the basis for an NFC enabled device 200. It is to be understood that the wireless device 100 is shown with specific details for exemplary purposes only. A processing device (a microprocessor 128) is shown schematically as coupled between a keyboard 114 and a display 126. The processing device 128 may provide the device host 203 (FIG. 1) functionality. The microprocessor 128 controls operation of the display 126, as well as overall operation of the wireless device 100, in response to actuation or selection of keys on the keyboard 114 by a user.

The wireless device 100 may be embodied in various sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The short-range communications subsystem 102 may comprise an NFCC 201. The memory devices of the wireless device 100 may further comprise NFCEEs 204, 205, 206, 207. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™, GERAN or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GERAN or GPRS networks, however, network access is typically associated with a subscriber or user of a device. A GPRS device therefore typically has a subscriber identity module, commonly referred to as a Subscriber Identity Module (SIM) card, in order to operate on a GPRS network. The SIM card could be used as an NFCEE 207.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices. Furthermore, the short-range communications subsystem 102 may comprise an NFCC 201 providing an air interface 202.

In summary, methods and systems for connecting a remote reader with an application hosted by one of a plurality of NFCEEs of a portable electronic device has been described in the present document. The methods and systems rely on the broadcasting and/or unicasting of an incoming SELECT (AID) command from a remote reader to the plurality of NFCEEs. Furthermore, the methods and systems rely on the analysis of the response message received from the plurality of NFCEEs. According to another aspect, the methods and systems may rely on the registration of the different applications directly with the NFC controller. As a result, a connection between the remote reader and the appropriate application may be set up. The described methods and systems using broadcasting and/or unicasting are beneficial in that no active action and initialization of the device host and/or the NFCEEs is required. Furthermore, the methods and systems are beneficial in that there is no interaction required between the DH and the different NFCEEs. In particular, the DH and the NFCEEs have no knowledge regarding the applications hosted on the other NFCEEs, thereby improving privacy and/or security among the different NFCEEs.

The methods and systems described in the present document may be implemented as software, firmware and/or hardware. Certain components may e.g. be implemented as software running on a digital signal processor or microprocessor. Other components may e.g. be implemented as hardware and/or as application specific integrated circuits. The messages or signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to perform NFC applications.

What is claimed is:

1. A method for identifying a near field communication (NFC) application on an NFC enabled device comprising a plurality of NFC execution environments and an NFC controller, wherein the NFC application is hosted by one of the plurality of NFC execution environments, the method executed by the NFC controller and comprising:

receiving, over an air interface, an external request for accessing the NFC application;

forwarding an inquiry associated with the external request to more than one of the plurality of NFC execution environments;

receiving more than one response to the inquiry from the more than one of the plurality of NFC execution environments, respectively;

analyzing the more than one response to identify a positive response indicating that the NFC application is hosted by a corresponding one of the plurality of NFC execution environments;

sending the positive response over the air interface; and forwarding further data traffic coming over the air interface to the NFC execution environment from which the positive response was received.

2. The method of claim 1, further comprising:

prior to receiving the external request, sniffing data traffic coming over the air interface to detect the request for accessing the NFC application, wherein only an inquiry associated with the detected request for accessing the NFC application is forwarded to the more than one of the plurality of NFC execution environments.

3. The method of claim 1, wherein forwarding the inquiry comprises broadcasting the inquiry to all of the plurality of NFC execution environments.

4. The method of claim 1, wherein forwarding the inquiry comprises sequentially unicasting the inquiry to the more than one of the plurality of NFC execution environments;

receiving more than one response comprises receiving a response from a NFC execution environment subject to the respective unicast inquiry; and analyzing comprises analyzing the received response subject to the unicast inquiry.

5. The method of claim 1, wherein forwarding the inquiry comprises forwarding the inquiry to a first of the more than one of the plurality of NFC execution environments;

receiving more than one response comprises receiving a first response from the first of the more than one of the plurality of NFC execution environments;

analyzing comprises determining from the first response that the NFC application is not hosted by the first of the more than one of the plurality of NFC execution environments;

forwarding the inquiry further comprises forwarding the inquiry to a second of the more than one of the plurality of NFC execution environments;

receiving more than one response further comprises receiving a second response from the second of the more than one of the plurality of NFC execution environments; and analyzing further comprises analyzing the second response.

6. The method of claim 1, wherein the NFC controller receives the external request from an external device at a remote location, and wherein the external request for accessing the NFC application corresponds to an ISO7816-4 SELECT Application Identifier (AID) message, the AID being an identifier of the NFC application.

7. The method of claim 1, further comprising:

monitoring the more than one received response to verify that a response has been received from each of the more than one of the plurality of NFC execution environments; and while monitoring, sending a waiting time-out message over the air interface to avoid a time-out of a connection to a sender of the external request for accessing the NFC application.

8. The method of claim 1, wherein the NFC application is a card emulation application allowing a reader and/or writer that is remote or external to the NFC enabled device (200) to read from and/or write to the NFC enabled device (200) as if the NFC enabled device (200) were an ISO 14443 compatible contactless smart card.

9. The method of claim 1, wherein the air interface
is compatible with ISO 18000-3; and/or
is operated at 13.56 MHz, and/or
has a range of less than 20 cm.

10. The method of claim 1, further comprising extending a waiting time to receive the more than one response in order to prevent a connection timeout before the NFC controller sends a final response to a sender of the external request, wherein the NFC enabled device (200) is one of: a mobile telephone or a smart phone or a portable electronic device or a handheld device or a wireless device or a mobile station.

11. The method of claim 1, further comprising subject to identifying a plurality of positive responses from a corresponding set of the more than one of the plurality of NFC execution environments (204, 205, 206, 207):
determining a selected NFC execution environment (204, 205, 206, 207) from the set;
sending the positive response from the selected NFC execution environment (204, 205, 206, 207) over the air interface (202); and
forwarding further data traffic coming over the air interface (202) to the selected NFC execution environment (204, 205, 206, 207).

12. A method for identifying a particular Near Field Communication (NFC) application on an NFC enabled device comprising a plurality of NFC execution environments, wherein the particular NFC application is hosted by one of the plurality of NFC execution environments, the method comprising:
registering a subset of NFC applications hosted by the plurality of NFC execution environments with an NFC controller of the NFC enabled device;
subject to the registering, establishing an NFC application database at the NFC controller indicating a mapping between registered NFC applications and the NFC execution environments which are hosting the registered NFC applications;
receiving, over an air interface, an external request at the NFC controller for accessing the particular NFC application; and
consulting the NFC application database to determine a particular NFC execution environment hosting the particular NFC application.

13. A Near Field Communication (NFC) controller configured to identify an NFC application on an NFC enabled device comprising a plurality of NFC execution environments, wherein the NFC application is hosted by one of the plurality of NFC execution environments, the NFC controller
receiving, over an air interface, an external request for accessing the NFC application;
forwarding an inquiry associated with the external request to more than one of the plurality of NFC execution environments;
receiving more than one response to the inquiry from the more than one of the plurality of NFC execution environments, respectively;
analyzing the more than one response to identify a positive response indicating that the NFC application is hosted by a corresponding one of the plurality of NFC execution environments;
sending the positive response over the air interface; and
forwarding further data traffic coming over the air interface to the NFC execution environment from which the positive response was received.

14. A near field communication (NFC) controller configured to identify a particular NFC application on an NFC enabled device comprising a plurality of NFC execution environments, wherein the particular NFC application is hosted by one of the plurality of NFC execution environments, the NFC controller
receiving a registration of a subset of NFC applications hosted by the plurality of NFC execution environments;
subject to the registration, establishing an NFC application database indicating a mapping between registered NFC applications and the NFC execution environments which are hosting the registered NFC applications;
receiving, over an air interface, an external request for accessing the particular NFC application; and
consulting the NFC application database to determine a particular NFC execution environment hosting the particular NFC application.

15. An electronic device comprising:
a plurality of Near Field Communication (NFC) execution environments, one of the plurality of NFC execution environments hosting an NFC application; and
an NFC controller according to claim 13 configured to identify the one of the plurality of NFC execution environments hosting the NFC application, subject to a request received via an air interface from a remote reader and/or remote writer.

16. An electronic device comprising:
a plurality of Near Field Communication (NFC) execution environments, one of the plurality of NFC execution environments hosting an NFC application; and
an NFC controller according to claim 14 configured to identify the one of the plurality of NFC execution environments hosting the NFC application, subject to a request received via an air interface from a remote reader and/or remote writer.

17. A non-transitory computer program product comprising a storage medium having computer-executable instructions for, when executed on an NFC enabled device, performing the method of claim 1.

18. A non-transitory computer program product comprising a storage medium having computer-executable instructions for when executed on an NFC enabled device, performing the method of claim 12, wherein receiving the external request over the air interface comprises the NFC controller receiving the external request from a device residing at a location remote to the NFC controller.

* * * * *